United States Patent
Gentile

(10) Patent No.: US 7,613,928 B2
(45) Date of Patent: *Nov. 3, 2009

(54) FLASH DEVICE SECURITY METHOD UTILIZING A CHECK REGISTER

(75) Inventor: Robert Gentile, Boise, ID (US)

(73) Assignee: Micron Technology, P.A., Boise, ID (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/280,469

(22) Filed: Nov. 16, 2005

(65) Prior Publication Data

US 2006/0069924 A1   Mar. 30, 2006

Related U.S. Application Data

(63) Continuation of application No. 09/818,425, filed on Mar. 27, 2001, now Pat. No. 6,996,721.

(51) Int. Cl.
*H04L 9/00* (2006.01)

(52) U.S. Cl. .................. 713/184; 713/183; 713/2; 711/164; 710/36; 710/107; 710/200

(58) Field of Classification Search .............. 380/44; 713/183, 184, 185, 2; 711/164; 726/26, 726/30; 710/36, 107, 200
See application file for complete search history.

(56) References Cited

U.S. PATENT DOCUMENTS

| | | | |
|---|---|---|---|
| 4,757,533 A | 7/1988 | Allen et al. | |
| 4,796,235 A | 1/1989 | Sparks et al. | |
| 4,819,204 A | 4/1989 | Schrenk | |
| 4,975,878 A | 12/1990 | Boddu et al. | |
| 5,012,514 A | 4/1991 | Renton | |
| 5,327,564 A | 7/1994 | Little | |
| 5,442,704 A | 8/1995 | Holtey | |
| 5,469,564 A | 11/1995 | Junya | |
| 5,666,516 A | 9/1997 | Combs | |
| 5,774,545 A | 6/1998 | Raghavachari | |
| 5,778,070 A * | 7/1998 | Mattison | 713/191 |
| 5,844,986 A | 12/1998 | Davis | |
| 6,018,800 A | 1/2000 | Ruckdashel | |
| 6,032,237 A | 2/2000 | Inoue et al. | |
| 6,311,273 B1 | 10/2001 | Helbig, Sr. et al. | |
| 6,480,097 B1 | 11/2002 | Zinsky et al. | |
| 6,633,981 B1 | 10/2003 | Davis | |
| 6,715,049 B1 | 3/2004 | Hayakashi | |

\* cited by examiner

*Primary Examiner*—Matthew B Smithers
*Assistant Examiner*—Paul Callahan
(74) *Attorney, Agent, or Firm*—Leffert Jay & Polglaze, P. A.

(57) ABSTRACT

A security method for preventing accidental or unauthorized writes to a flash memory. According to one embodiment of the present invention, a BIOS program stored in a flash memory array generates a random access code when executed by a processor. A check register stores the random access code and enables write operations to the flash memory array based upon an externally provided access code. In another embodiment, the BIOS program directs the processor to write the random access code to the check register to enable write operations in response to an external write request.

22 Claims, 8 Drawing Sheets

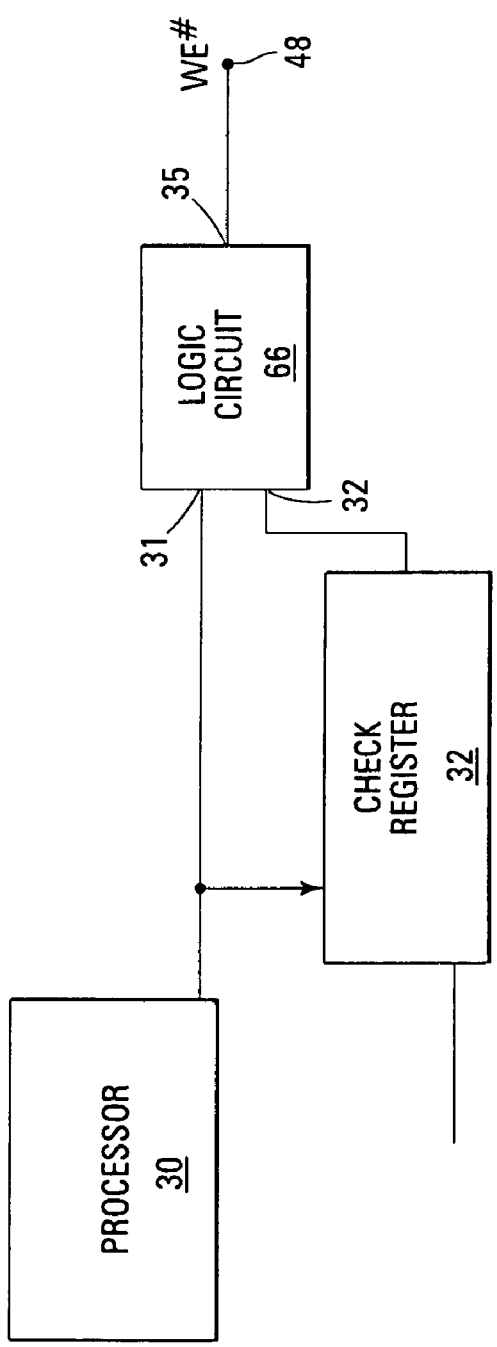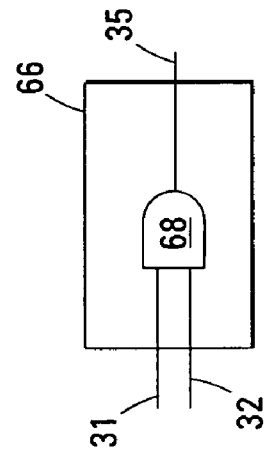
Fig. 6
Fig. 7

FLASH DEVICE SECURITY METHOD UTILIZING A CHECK REGISTER

RELATED APPLICATIONS

This application is a continuation of U.S. patent application Ser. No. 09/818,425, filed Mar. 27, 2001 and titled, FLASH DEVICE SECURITY METHOD UTILIZING A CHECK REGISTER, now U.S. Pat. No. 6,996,721, which is commonly assigned and incorporated by reference herein in its entirety.

TECHNICAL FIELD OF THE INVENTION

The present invention relates generally to non-volatile memory devices and in particular the present invention relates to a security method for preventing accidental or unauthorized writes to a flash memory.

BACKGROUND OF THE INVENTION

Memory devices are typically provided as internal storage areas in a computer. The term memory identifies data storage that comes in the form of integrated circuit chips. There are several different types of memory, including random access memory (RAM). RAM is typically used as main memory in a computer environment. Most RAM is volatile, which means that it requires a steady flow of electricity to maintain its contents. As soon as the power is turned off, whatever data was in RAM is lost.

Computers can also contain a small amount of read-only memory (ROM) that holds instructions for starting up the computer. This type of memory retains stored data when the power is turned off and is generally referred to as non-volatile memory. An EEPROM (electrically erasable programmable read-only memory) is a special type of non-volatile ROM that can be erased by exposing it to an electrical charge. Like other types of ROM, EEPROM is traditionally not as fast as RAM. EEPROM comprise a large number of memory cells having electrically isolated gates (floating gates). Data is stored in the memory cells in the form of charge on the floating gates. Charge is transported to or removed from the floating gates by programming and erase operations, respectively.

Yet another type of non-volatile memory is a flash memory. A flash memory is a type of EEPROM that can be erased and reprogrammed in blocks instead of one byte at a time. Many modern computers have their basic I/O system (BIOS) stored on flash memory chips. A BIOS is a program that is used by a processor for starting the computer system when the power is turned on or reset (power-up). Upon power-up, instructions contained in the BIOS are transferred to a processor, thereby giving the processor the instructions it needs to properly start up and operate the system. The BIOS also manages the data flow between the computer's operating system and the hardware of the computer system. Storing a BIOS in a flash memory is desirable because it allows the BIOS to be easily updated as needed. However, since write operations to a flash memory chip are easy to accomplish, the potential for accidental or unauthorized writes is increased. Therefore, an effective way to secure a flash memory array from accidental or unauthorized writes is needed.

For the reasons stated above, and for other reasons stated below which will become apparent to those skilled in the art upon reading and understanding the present specification, there is a need in the art for a flash memory that has the ability to secure the memory array from accidental or unauthorized writes.

SUMMARY OF THE INVENTION

The above-mentioned problems with memory devices and other problems are addressed by the present invention and will be understood by reading and studying the following specification.

In one embodiment, the present invention provides a flash memory device that has a memory array and a check register to store an access code. The check register only allows write operations to the memory array in response to the access code.

In another embodiment, a flash memory system comprises a flash memory array having a BIOS program and a check register. The BIOS program contains a program to generate a random access code when executed by a processor. The check register stores the random access code and enables write operations to the flash memory array based upon an externally provided access code.

In another embodiment, a flash memory system comprises a processor to process data, a memory array that stores a BIOS program to instruct the processor to generate an access code and a check register to store the access code generated by the processor. The check register enables write operations to the memory array in response to writes of the access code.

In another embodiment, a flash memory system comprises a processor to process data, a memory array that stores a BIOS program, control circuitry to control write operations to the memory array in response to a write enable signal, and a check register to store an access code generated by the processor. The BIOS program contains a program to instruct the processor to generate the access code at power up. The check register toggles the write enable signal between an active LOW and an inactive HIGH in response to writes of the access code.

In another embodiment, a flash memory system comprises a memory array having a BIOS program, a processor to execute the BIOS program, control circuitry to control write operations to the memory array in response to a write enable signal and a check register to store a random access code generated by the BIOS program. The check register gates the write enable signal to the control circuitry in response to the random access code.

In another embodiment, a flash memory system comprises a memory array having a BIOS program stored therein, control circuitry to control write operations to the memory array, a processor to execute the BIOS program and a program logic device to store a random access code generated by the processor from instructions contained in the BIOS program. The program logic device gates a write enable signal to the control circuitry in response to the random access code.

In another embodiment, a processor system comprises a non-volatile memory device, a code register coupled to the non-volatile memory device and a processor coupled to provide a request code to the code register. The code register controls a write enable signal of the non-volatile memory device.

A method of operating a flash memory comprises generating a random access code at power up, writing the access code to a check register, and toggling write enable signals in response to writes of the access code to the check register.

Another method of operating a flash memory system comprises powering up a flash memory, executing a BIOS program, generating a random access code in response to the executed BIOS program, storing the random access code in a check register, and toggling write enable signals of the flash memory in response to writes of the random access code to the check register.

Another method of operating a flash memory system comprises generating a random access code at power up, storing the random access code in a check register that controls a write enable signal to a flash memory, executing a utility program containing instructions to write to the flash memory, verifying the authenticity of the utility program, toggling the check register to assert the write enable signal, writing to the flash memory array, and toggling the check register to disable the write enable signal.

Another method of operating a flash memory system comprises executing a utility program containing instructions to write to a flash memory array, verifying the authenticity of the utility program with a BIOS program, asserting a write enable signal if the utility program is authenticated, and writing to the flash memory array.

Another method of operating a memory system comprises generating an enable code, issuing a write request from a processor wherein the write request comprises a request code, comparing the request code to the enable code, and providing a write enable signal to a memory device in response to the comparison.

BRIEF DESCRIPTION OF THE DRAWINGS

FIG. 6 is a block diagram of an embodiment of the present invention.

FIG. 7 is a block diagram of an embodiment of the logic circuit of the present invention.

DETAILED DESCRIPTION OF THE INVENTION

In the following detailed description of the present embodiments, reference is made to the accompanying drawings that form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
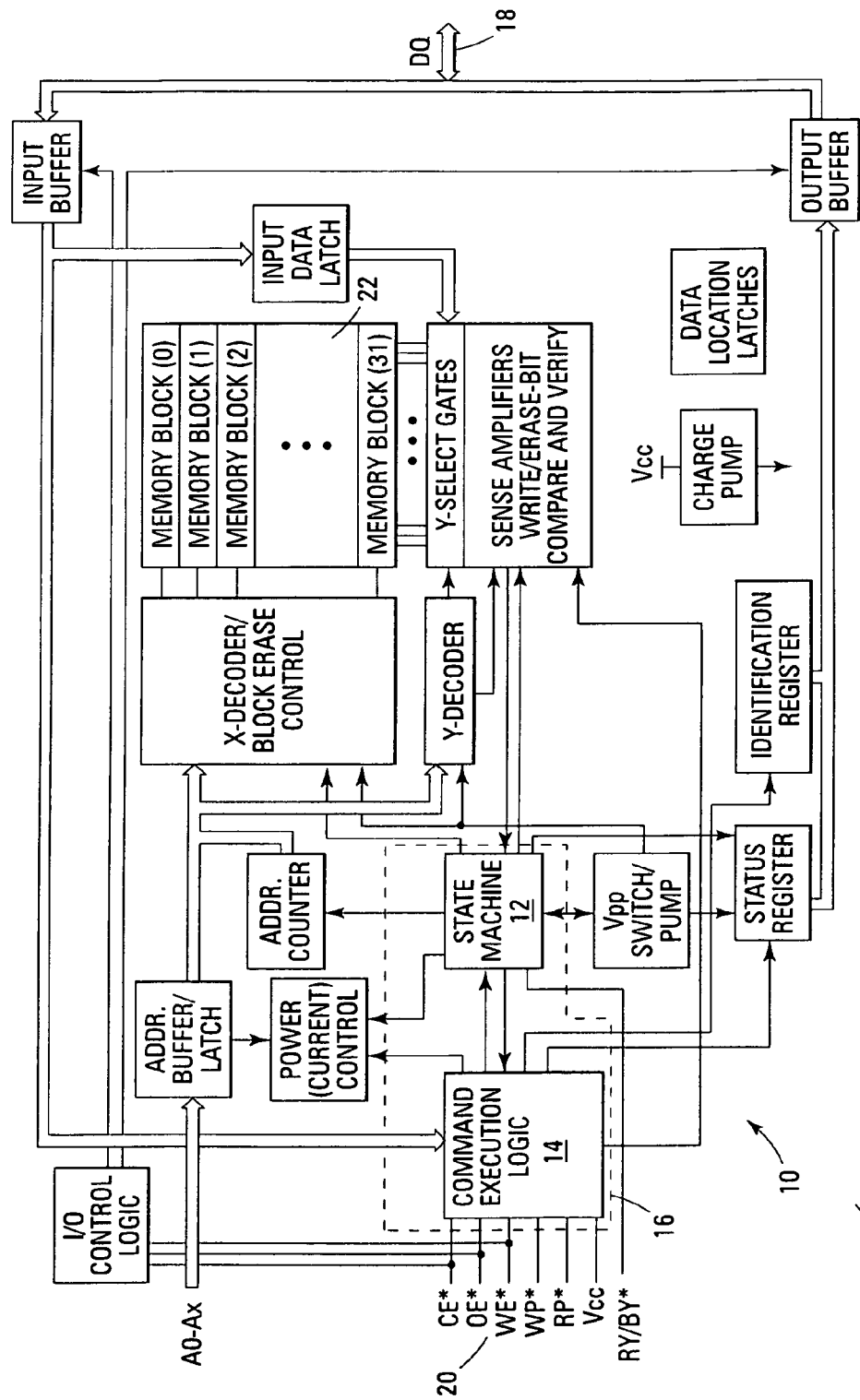
FIG. 1 is an illustration of a flash memory of the prior art.

A basic flash memory system is illustrated in FIG. 1. As illustrated, a write enable (WE#) connection 20 is coupled to a command execution logic circuit 14. The command execution logic circuit 14 controls the basic operations of the memory device. A state machine 12 is also provided to control specific operations performed on a memory array 22. The command execution logic circuit 14 and/or state machine 12 can be generally referred to as control circuitry 16. The control circuitry 16 controls read, write, erase and other memory operations. When an active LOW write enable signal is received on the WE# connection 20, the control circuitry 16 allows data on the DQ lines 18 to be written to the flash memory array 22. If however, an inactive HIGH write enable signal is received on the WE# connection 20, the control circuitry denies writes to the flash memory array 22.

Figure 2:
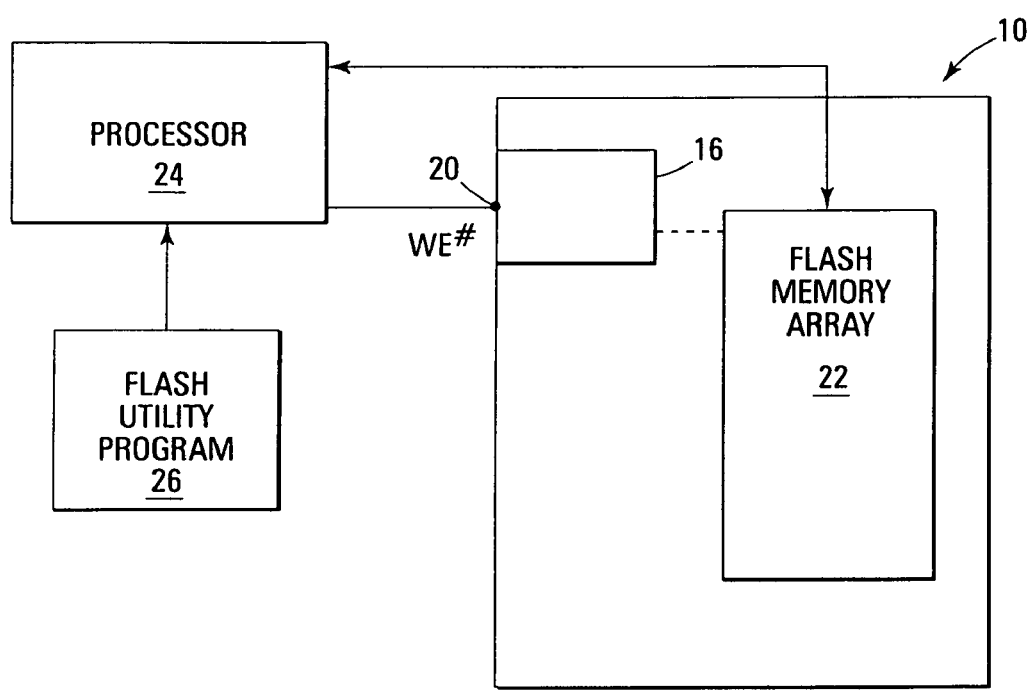
FIG. 2 is a block diagram of a prior art flash memory system.

Typically, in the prior art, a flash utility program 26 controls writes to the flash memory 10 as illustrated in FIG. 2. That is, the flash utility program 26 directs the processor 20 to send an active LOW write enable signal to the WE# connection 20 on the flash memory 10 to enable a write operation. The flash utility program 26, is usually written by the computer or memory manufacture and is specific to the computer's motherboard. The manufacture typically releases documents regarding reflashing the BIOS. Reflashing the BIOS refers to the process of rewriting the BIOS program to the flash memory array 22 while the system is operational. Write operations are not secure in the prior art because an individual with ill intent could easily figure out how to toggle the write enable signals using the documents released by the manufacture regarding reflashing or by de-compiling the flash utility program 26.

The present invention secures write operations to the flash memory array 22 by gating the write enable signals. The BIOS in the present invention, directs a processor to generate a random access code, or enable code, on power-up that is specific to each boot cycle. That is, the random access code generated during the booting of a computer system, is maintained until the power is removed from the system or the system is reset. Thereafter, a different random code is generated the next time the system is booted. The booting of a computer system is the process by which the computer system is placed into an operational state after power-up. In the present invention, a write operation to the flash memory array is denied unless a request code is provided that matches the access code generated during the then current boot cycle. This design prevents accidental or unauthorized writes.

Figure 3:
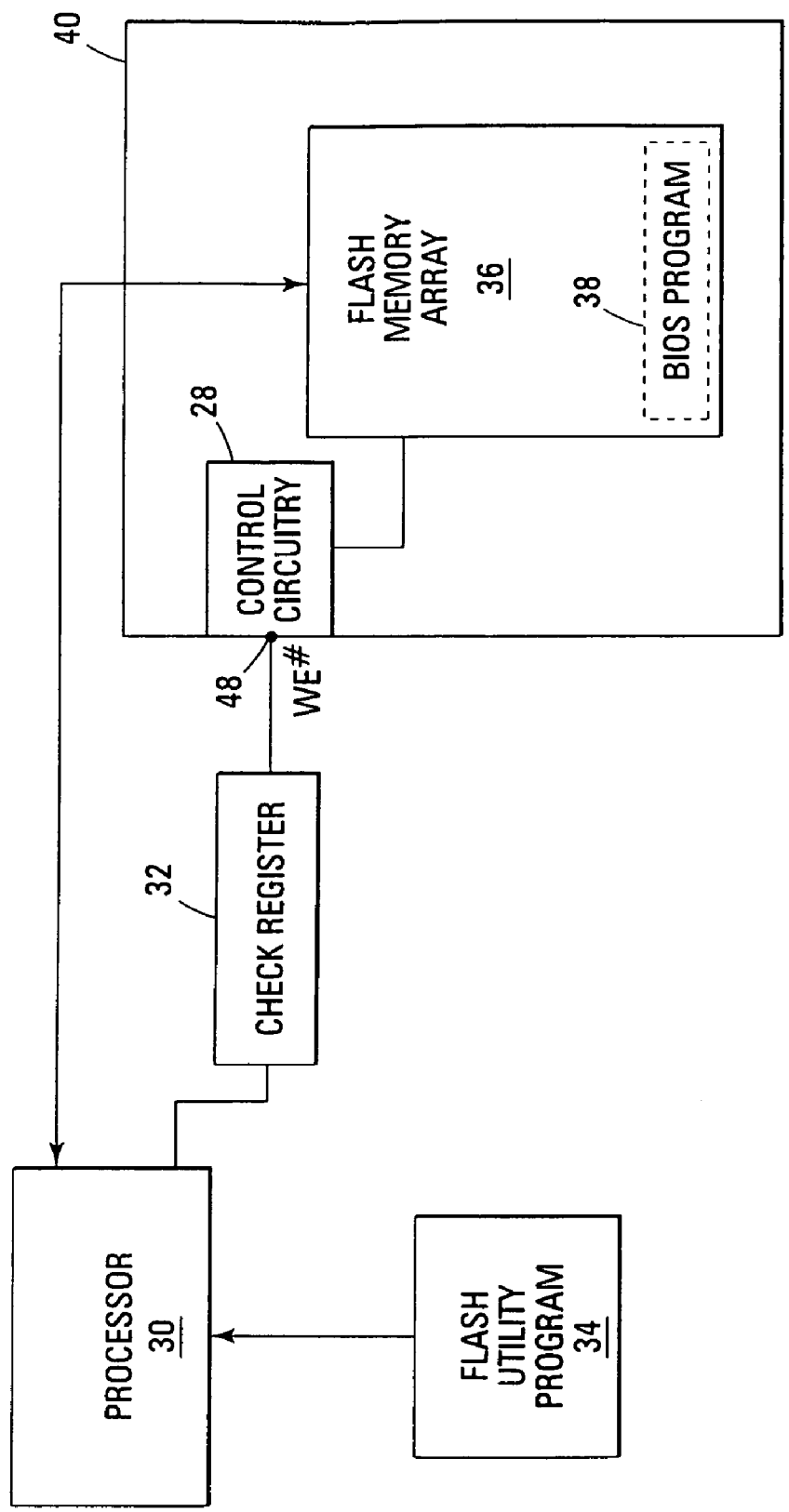
FIG. 3 is a block diagram of an embodiment of the present invention.

One embodiment of the present invention is illustrated in FIG. 3. As illustrated, the present invention includes a processor 30, a code register or check register 32, a flash memory 40 and a flash utility program 34. The flash memory 40 includes a flash memory array 36, control circuitry 28 and a WE# connection 48. Moreover, the flash memory array 36 includes a BIOS program 38 that is stored in the flash memory array 36. The BIOS 38 contains an access code generating program that directs the processor 30, upon power up and execution of the program, to generate a random access code. The processor 30 stores the access code in check register 32. The check register 32 gates write enable signals to the WE# connection 48 thereby controlling write operations to the flash memory array 36. Thereafter, each write request to the flash memory array 36 must include a request code that matches the access code in the check register 32 or the write request will be denied.

In one embodiment, the BIOS 38 program also maintains the access code. BIOS 38 and check register 32 use the access code to gate the write enable signals to the memory control circuitry 28 during write operations. When a user executes a program containing an instruction to write to the flash memory array 36, the write operation will be denied by the BIOS 38 unless the program has an authorization code that is recognized by the BIOS 38. However, if the program has the authorization code, the BIOS 38 sends the access code to the check register 32 toggling the write enable signal to an active LOW. The program can then perform a write operation to the flash memory array 36. Once the program has completed the write operation, the BIOS 38 once again sends the access code to the check register 32 thereby toggling the write enable signal to an inactive HIGH. The authorization code in the program recognized by the BIOS 38 can be made more secure by changing the authorization code with each reflashing of the BIOS 38.

Although, the access code does not have to be generated at each power-up, there are certain advantages of doing so, especially in a computer environment. During the booting of a computer, optional third party software programs can be executed that the BIOS 38 has no control over. For example, one of the first things to occur after the initial boot-up of a personal computer is that a video BIOS program on a video card may be executed. During execution of the video BIOS program, the BIOS program 38 of the system transfers control over to the video BIOS program. During this time an unintentional or unauthorized write could be made to the flash memory array. This situation provides a weak point in security of the computer. These security risks can be avoided by setting the access code before the optional third party software programs are executed. In addition, having a dynamic random access code that is generated at each power-up makes it extremely difficult for someone to discover the access code.

Figure 4:
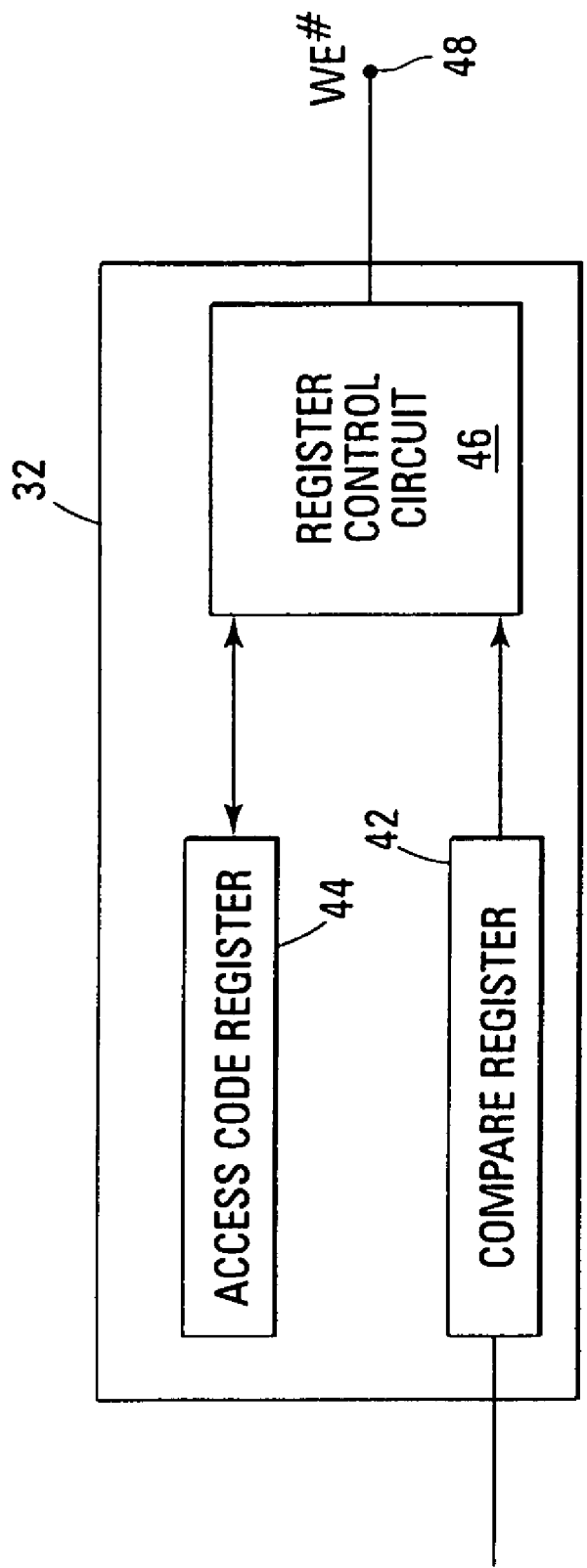
FIG. 4 is a block diagram of an embodiment of a check register of the present invention.

One embodiment of check register 32 is illustrated in FIG. 4. As illustrated, the check register 32 includes a compare register 42, an access code register 44 and a register control circuit 46. The register control circuit 46 controls operations of the check register 32. The first time the access code is written to the compare register 42, the register control circuit 46 transfers and saves the access code to the access code register 44. Thereafter, each time a code is written to the compare register 42, the register control circuit 46 compares the code in the compare register 42 with the access code in the access code register 44. If the code matches the access code, the register control circuit 46 toggles the write enable signal that is received by the WE# connection 48 to either an active LOW to allow a write operation to the flash memory array 36 or an inactive HIGH to deny a write operation to the flash memory array 38.

The size of the access code size could be 8, 16, 32 or 64 bits. The larger the number of bits the more difficult the access code will be to discover. However, it will be appreciate by those skilled in the art that the bit length of the access code can very with the size of the registers used and that the present invention is not limited to 8, 16, 32 or 64 bits. In addition, the storage devices in the check register 32 are designed so that the random access code generated at power up is erased when the power is removed. This ensures the check register is ready to accept a new access code at the next power up. This can be accomplished by using storage devices in the check register 32 that are volatile.

Figure 5:
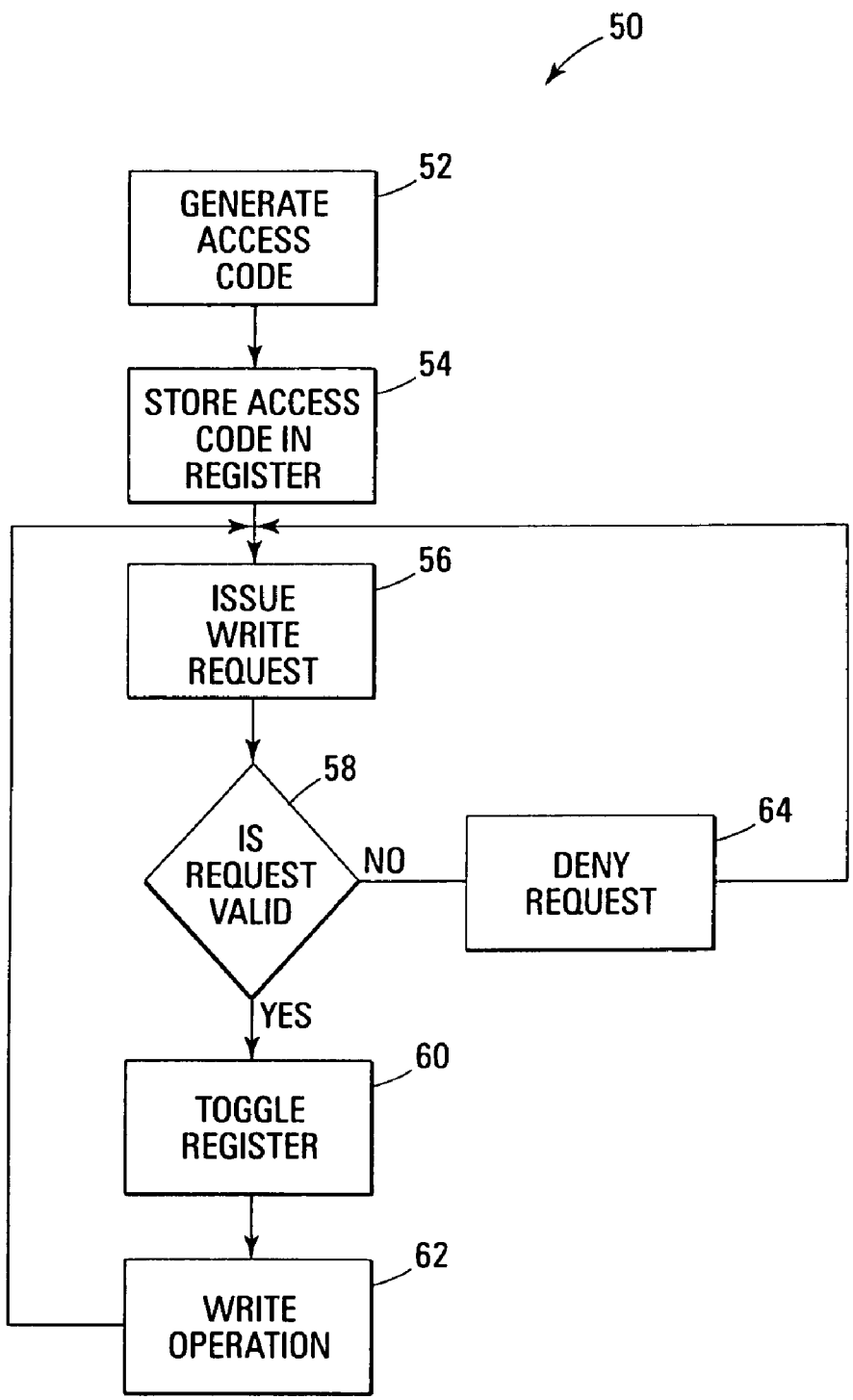
FIG. 5 is a flow chart illustrating a method of an embodiment of the present invention.

A flow chart illustrating a method 50 of gating write enable signals according to one embodiment of the present invention is illustrated in FIG. 5. The method 50 includes generating an access code 52, storing the access code in a register 54, issuing a write request 56 and verifying if the request is valid 58. If the request is valid, toggling the register to send an active LOW write enable signal 60 and then performing a write operation 62. If the request is not valid, denying the request 64.

In another embodiment, a logic circuit 66 automatically toggles the write enable signal to an inactive HIGH after the completion of a write operation. This embodiment is illustrated in FIG. 6. In this embodiment, the BIOS does not have to write the access code to the check register to toggle the write enable signal from an active LOW to an inactive HIGH after the write operation is completed. As illustrated, an output of the processor 30 carrying the write enable signal is coupled to a first input 31 of the logic circuit 66 and the check register 32. An output of the check register is coupled to a second input 33 of the logic circuit 66. An output 35 of the logic circuit 66 is coupled to the WE# connection 48. The logic circuit 66 outputs an active LOW write enable signal when active LOW write enable signals are simultaneously received in both inputs of the logic circuit 66. Otherwise, the logic circuit 66 outputs an inactive HIGH write enable signal thereby preventing writes to the flash memory array. Therefore, once the program has completed its write operation and ceased sending the active LOW write enable signal, the logic circuit 66 automatically ceases to send the active LOW write enable signal to the WE# connection 48, thereby disabling write operations to the flash memory. In one embodiment, the logic circuit 66 includes an AND logic function as illustrated in FIG. 7.

Although, an active LOW write enable signal is described as allowing write operations and an inactive HIGH write enable signal as denying write operations, it will be appreciated by those in the art that the flash memory 40 could be designed so that an active HIGH signal allows write operations and an inactive LOW signal denies write operations. Therefore, the present invention is not limited to an active LOW signal and an inactive HIGH signal.

Figure 8:
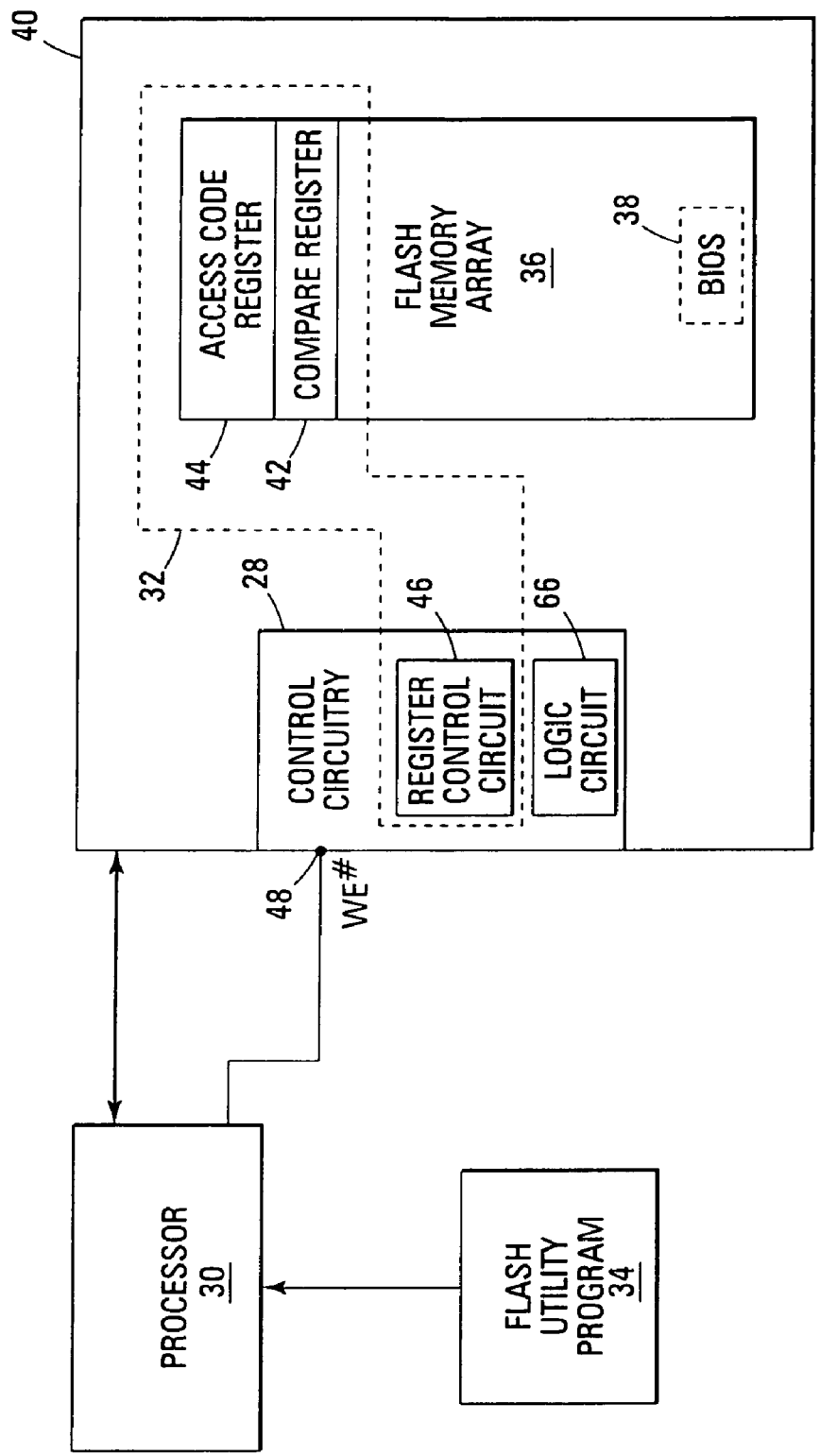
FIG. 8 is a block diagram illustrating one embodiment of the present invention that is contained in the flash memory.

Moreover, even though the check register 32 is illustrated in FIG. 2 as being coupled between the processor 30 and the flash memory array 36, it will be appreciated by those in the art that the check register 32 could be placed in a number of storage mediums of the system that may or may not be positioned between the processor and the flash memory array. For example, in one embodiment of the present invention, the check register 32 is embedded in the flash memory 38, as illustrated in FIG. 8. This embodiment provides a secure design because the check register 32 cannot be physically bypassed to get around the access code requirement. In this embodiment, the access code register 44 and the compare register 42 of the check register 32 are mapped into the memory space of the flash chip 38. This allows the system to write to the check register 32 directly through an address data bus in a flash chip 38 in the same manner the system writes data to the flash memory array 36. Moreover, the register control circuit 46 of the check register 32 and the logic circuit 66 can be contained in the control circuitry 28 of the flash memory 38.

Figure 9:
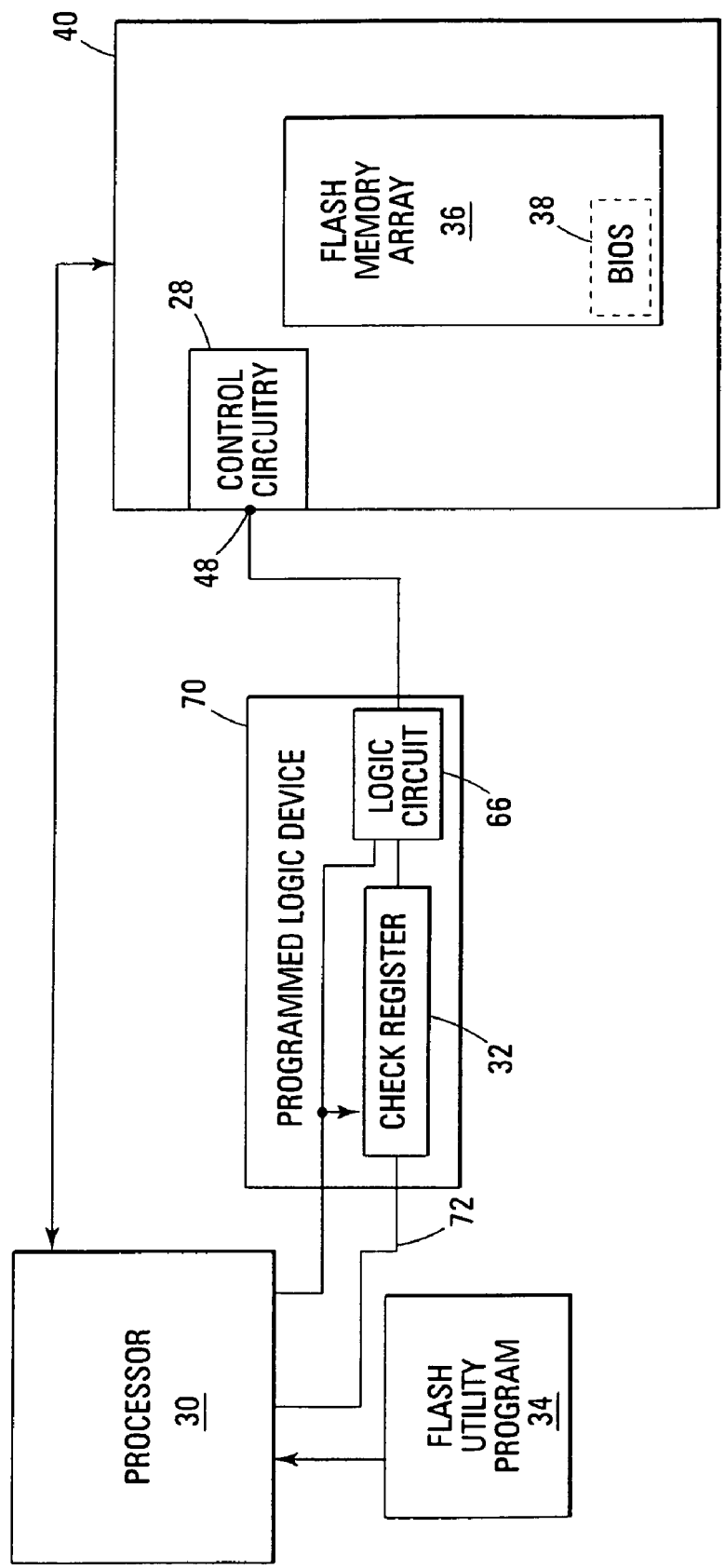
FIG. 9 is a block diagram illustrating another embodiment of the present invention that is located outside of the flash memory.

In another embodiment, the check register 32 and logic circuit 66 are placed outside the flash chip 38 in a programmed logic device 70. This embodiment is illustrated in FIG. 9. The programmed logic device 70 implements the check register 32, the logic circuit 66 and the write enable signals. This embodiment may be desired because it can be implemented without having a specialized flash device. Another advantage to this embodiment is that the program logic device 70 can be updated without replacing the flash chip 40. For added security, an exterior serial bus 72 can be used to couple the check register 32 of the programmed logic device 70 to the processor 30. A serial bus makes it difficult for someone to discover the access code by tapping into the bus because in a serial bus it is difficult to determine when valid data starts and stops.

In another embodiment of the present invention, reflashing the BIOS 38 requires that the replacement BIOS program contains the access code generating program. This is required since the original BIOS 38 that contained the access code generating program will have been erased. An alternative embodiment, stores the access code generating program in a portion of the flash memory that is protected from being written over. In this embodiment the updated BIOS 38 does not need to contain the program to generate the random access code at boot up, since that part of the program was not erased during the reflashing.

CONCLUSION

A security method for preventing accidental or unauthorized writes to a flash memory has been described. According to one embodiment of the present invention, a BIOS program stored in a flash memory array generates a random access code when executed by a processor. A check register stores the random access code and enables write operations to the flash memory array based upon an externally provided access code. In another embodiment, the BIOS program directs the processor to write the random access code to the check register to enable write operations in response to an external write request.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A flash memory system comprising:
a memory array that contains a set of instructions adapted to cause an external device to initiate the creation of an access code by executing the set of instructions at the external device; and
a check register to store the access code from the external device, wherein the check register generates a write enable signal to the memory array in response to receiving the access code, wherein the check register comprises:
a compare register to store codes;
an access code register to store the access code from the external device; and
a register control circuit to compare a code stored in the compare register to the access code, wherein the register control circuit generates the write enable signal when a code written to the compare register matches the access code.

2. The flash memory system of claim 1 wherein the check register toggles a write enable signal in response to an externally provided access code.

3. A flash memory system comprising:
a memory array that contains a set of instructions adapted to cause an external device to initiate the creation of an access code by executing the set of instructions at the external device; and
a check register to store the access code from the external device, wherein the check register generates a write enable signal to the memory array in response to receiving the access code;
wherein the check register is volatile so the access code is erased when power is removed from the check register.

4. A flash memory system comprising:
a memory array that contains a set of instructions adapted to cause an external device to initiate the creation of an access code; and
a check register to store the access code from the external device, wherein the check register generates a write enable signal to the memory array in response to the access code;
wherein the access code is randomly generated by a program executed by a processor.

5. The flash memory system of claim 4 wherein the program is generally executed immediately after power is applied to the processor.

6. A flash memory system comprising:
a flash memory array having a BIOS program stored therein, wherein the BIOS program contains a program to initiate an access code generation by a processor; and
a check register to store the access code from the processor, wherein the check register generates a write enable signal to the flash memory array based upon a request code from the processor;
wherein the BIOS program directs the processor to write the access code to the check register to enable write operations in response to an external write request containing the request code.

7. The flash memory system of claim 6 wherein the BIOS program controls writes of the access code to the check register.

8. A flash memory system comprising:
a flash memory array having a BIOS program stored therein, wherein the BIOS program contains a program to initiate an access code generation by a processor; and
a check register to store the access code from the processor, wherein the check register generates a write enable signal to the flash memory array based upon a request code from the processor;
wherein the program to generate the access code is located in a portion of the flash memory array that is protected from being written over.

9. A flash memory system comprising:
a flash memory array having a BIOS program stored therein, wherein the BIOS program contains a program to initiate an access code generation by a processor;
a check register to store the access code from the processor, wherein the check register generates a write enable signal to the flash memory array based upon a request code from the processor;
wherein the cheek register comprises:
a compare register to store codes;
an access code register to store the access code; and
a register control circuit to compare a code stored in the compare register to the access code, wherein the register control circuit generates a write enable signal when a code written to the compare register matches the access code.

10. The flash memory system of claim 9 wherein the first write of a code to the compare register after boot up is stored in the access code register.

11. A flash memory system comprising:
a flash memory array having a BIOS program stored therein, wherein the BIOS program contains a program to initiate an access code generation by a processor;
a check register to store the access code from the processor, wherein the cheek register generates a write enable signal to the flash memory array based upon a request code from the processor;
wherein a flash utility program, coupled to the processor, requests the BIOS to write the access code to the check register.

12. A flash memory system comprising:
a memory array having a BIOS program stored therein;
control circuitry to control write operations to the memory array;
a processor to execute the BIOS program; and a programmed logic device having a code register to store a random access code generated by the processor in response to instructions contained in the BIOS program, wherein the programmed logic device gates a write enable signal to the control circuitry in response to a comparison of the stored random access code and a request code from the processor.

13. The processor system of claim 12 wherein the code register is volatile.

14. The processor system of claim 12 wherein the processor is adapted to generate a write command that contains the request code.

15. The processor system of claim 12 wherein the BIOS is stored in non-volatile memory.

16. A method for operating a flash memory device having a check register and a memory array, the method comprising:
   instructing an external device to generate a first access code at power up;
   receiving the access code for storage in the check register; and
   toggling a write enable signal to the memory array in response to a comparison of a second access code contained in a received write command and the first access code.

17. The method of claim 16 wherein a BIOS program stored in the flash memory instructs a processor to generate the first access code.

18. The method of claim 16 wherein the BIOS program controls the writes of the first access code to the check register.

19. A method for operating a memory system having a memory device and a processor, the method comprising:
   the memory device directing the processor to generate an enable code;
   the processor issuing a write command to the memory device, the write command comprising a request code; and
   comparing the request code to the enable code and generating or disabling a write enable signal to the memory device in response to the comparison.

20. The method of claim 19 and further including the processor storing the enable code in a code register in the memory device.

21. The method of claim 20 wherein the processor generates the enable code while executing a BIOS program during an initialization operation of the processor.

22. The method of claim 21 wherein the BIOS program is stored in a memory.

\* \* \* \* \*

UNITED STATES PATENT AND TRADEMARK OFFICE
CERTIFICATE OF CORRECTION

| | | |
|---|---|---|
| PATENT NO. | : 7,613,928 B2 | Page 1 of 1 |
| APPLICATION NO. | : 11/280469 | |
| DATED | : November 3, 2009 | |
| INVENTOR(S) | : Gentile | |

It is certified that error appears in the above-identified patent and that said Letters Patent is hereby corrected as shown below:

In column 8, line 40, in Claim 9, delete "cheek" and insert -- check --, therefor.

In column 8, line 57, in Claim 11, delete "cheek" and insert -- check --, therefor.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,613,928 B2 Page 1 of 1
APPLICATION NO. : 11/280469
DATED : November 3, 2009
INVENTOR(S) : Robert Gentile It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this

Nineteenth Day of October, 2010

David J. Kappos
*Director of the United States Patent and Trademark Office*